(12) United States Patent
Troxell et al.

(10) Patent No.: US 7,176,885 B2
(45) Date of Patent: *Feb. 13, 2007

(54) RETASKABLE SWITCH-INDICATOR UNIT (75) Inventors: John R. Troxell, Sterling Heights, MI (US); Larry M. Oberdier, Royal Oak, MI (US); Marie I. Harrington, Troy, MI (US)

(73) Assignee: Delphi Technologies, Inc., Troy, MI (US)

(*) Notice: Subject to any disclaimer, the term of this patent is extended or adjusted under 35 U.S.C. 154(b) by 537 days.

This patent is subject to a terminal disclaimer.

(21) Appl. No.: 10/731,644

(22) Filed: Dec. 9, 2003

(65) Prior Publication Data

US 2004/0119688 A1 Jun. 24, 2004

Related U.S. Application Data

(63) Continuation-in-part of application No. 10/281,863, filed on Oct. 28, 2002.

(51) Int. Cl.
*G09G 5/00* (2006.01)
(52) U.S. Cl. .................................... 345/156; 345/176
(58) Field of Classification Search ................ 345/156, 345/157, 158–176, 177, 178, 183; 178/18.01, 178/18.04, 19.01, 18.03, 18.07, 19.03; 715/862
See application file for complete search history.

(56) References Cited

U.S. PATENT DOCUMENTS

| | | | |
|---|---|---|---|
| 4,567,480 A * | 1/1986 | Blanchard | 345/175 |
| 5,886,687 A | 3/1999 | Gibson | |
| 5,942,733 A | 8/1999 | Allen et al. | |
| 6,054,979 A | 4/2000 | Sellers | |
| 6,204,839 B1 | 3/2001 | Mato, Jr. | |
| 6,611,093 B1 * | 8/2003 | Haven et al. | 313/496 |
| 2002/0067615 A1 * | 6/2002 | Muller | 362/486 |
| 2004/0080486 A1 * | 4/2004 | Troxell et al. | 345/156 |
| 2004/0238726 A1 * | 12/2004 | Caldwell | 250/221 |

* cited by examiner

*Primary Examiner*—Nitin Patel
(74) *Attorney, Agent, or Firm*—Jimmy L. Funke (57) ABSTRACT

An integrated switch-indicator unit includes a light emitting diode (LED) structure for providing a plurality of indicators and an overlay input device integrated with the LED structure. The overlay input device includes a non-conductive substrate and a plurality of conductive electrode pairs. The plurality of conductive electrode pairs are formed on the substrate and each form a proximity sensitive region and include a first electrode that receives an input signal and a second electrode that provides an output signal. The first and second electrodes are capacitively coupled and the capacitance of the electrode pair changes when a conductive member, e.g., a user's finger, is located near the electrode pair.

20 Claims, 6 Drawing Sheets

RETASKABLE SWITCH-INDICATOR UNIT

This application is a continuation-in-part of U.S. patent application Ser. No. 10/281,863, filed Oct. 28, 2002, and entitled "TRANSPARENT OVERLAY INPUT DEVICE," the disclosure of which is hereby incorporated herein by reference in its entirety.

TECHNICAL FIELD

The present invention is generally directed to a switch and, more specifically, to a retaskable switch-indicator unit.

BACKGROUND OF THE INVENTION

In a number of applications, various users of electronic systems have found it desirable to interact with the electronic systems through a display, e.g., a computer monitor, a television, a personal digital assistant (PDA) and automated teller, in order to input information into the system. Thus, a number of designers have utilized various technologies in an attempt to improve touch sensitive input devices, such as touch sensitive screens and digitizer pads. Various types of these input devices have been designed using, for example, capacitive, resistive, infrared, surface acoustic wave (SAW) and guided acoustic wave (GAW) technologies.

Most touch sensitive screens implementing capacitive technology have been realized by fusing a transparent thin film conductive coating onto a glass surface. A low voltage AC field has then been applied to and distributed across the conductive coating such that when a user's finger made contact with a surface of the screen it capacitively coupled with the AC field drawing a small amount of current to the point of contact. In such screens, the current flow from each corner of the conductive coating is proportional to the distance to the user's finger and the ratios of the current flows are measured by a control unit to determine where the user touched the screen.

Typically, resistive touch sensitive screens have utilized a contacting member, e.g., a stylus, to form a momentary connection between two semi-flexible conductive layers. A control unit then determines where the contacting member touched the screen by sensing a change in voltage. Infrared technologies have implemented control units that detect a change in infrared light propagation, initiated when a user touches a touch screen, to determine where the user touched the screen.

Touch pads implementing SAW technology have generally included a glass panel with transducers that transmit and receive surface waves over the face of the touch pad. When a finger or other object touched the surface of the screen, a portion of the energy of the wave was absorbed at that location, which could then be determined by a control unit, based upon the presence of interference patterns in the acoustic wave. Typical characteristics of input devices implementing the above-referenced technologies are set forth below in Table 1.

TABLE 1

|  | CAPACITIVE | RESISTIVE | INFRARED | GAW | SAW |
| --- | --- | --- | --- | --- | --- |
| Resolution (PPI) | >250 | >200 | 8 | 150 | 33 |
| Z-axis? | No | No | No | Yes | Yes |
| Ambient Light | Unaffected | Unaffected | Varies | Unaffected | Unaffected |
| Activation | Tactile | Tactile | Proximity | Tactile | Tactile |
| Parallax? | No | No | Yes | No | No |
| Response Time | 5–15 ms | 5–10 ms | 18–40 ms | 18–50 ms | 20–50 ms |
| Transmissivity | 85–92% | 65–80% | 100% | 92% | 92% |
| Sensor Reliability | 20 M touches/point | 35 M touches/point | 138K hrs MTBF | Unlimited | 50 M touches/point |
| Integration | Invasive or non-invasive. | Invasive. Optical bonding required. | Invasive or non-invasive. | Invasive. Optical bonding required. | Invasive. Optical bonding required. |
| Stylus Type | Requires conductive stylus. Cannot detect gloved finger. | No stylus limitation. | No stylus limitation. | Requires soft, energy absorbing stylus. | Requires soft, energy absorbing stylus. |
| Sensor Drift | Subject to drift. Requires repetitive calibration. | Subject to drift. Requires repetitive calibration. | Not subject to drift. | Not subject to drift. | Not subject to drift. |
| Durability | Conductive layer subject to wear. | Sensor is susceptible to scratches and abrasions. | Not susceptible to scratching, no overlay, solid state. | Difficult to scratch. Glass overlay is breakable. | Difficult to scratch. Glass overlay is breakable. |
| Dust/Dirt Resistance | Accumulation affects performance. | Not affected by dust and dirt. | Will operate with dust and dirt. Excessive accumulation may affect performance. | Not affected by dust and dirt. | Will operate with dust and dirt. Excessive accumulation may affect performance. |

The various technologies have relative advantages and disadvantages depending upon the specific application. None of the currently available technologies are generally suitable for automotive display applications, which require minimal interaction time between driver and touch sensitive input device, allowing the driver to keep his/her eyes on the road and drive in a safe manner. Further, in general, most automotive display applications require only a limited number of touch sensitive "spots," as opposed to devices such as personal digital assistants that allow high resolution touch sensitive response. In addition, the driver may be wearing gloves, which affects the ability of currently available touch screens to properly resolve a point of contact on a display's surface.

Many stand-alone switches are used in controlling automotive features and functions. Typically, these switches have dedicated functions, as indicated by artwork on the switches, and the switches are illuminated by small lamps or light pipes from a common lamp in the case of multiple switch pods. In general, such switches are not wired directly to the function that they are controlling, but instead serve as human interfaces to send appropriate control messages across a vehicle system bus from which information is extracted and used to actuate an appropriate function.

Light emitting structures, such as organic light emitting diodes (OLEDs) and polymer light emitting diodes (PLEDs), have been built on a variety of opaque and transparent substrates. In general, OLEDs and PLEDs, which may be designed to emit a variety of colors, may be built on rigid substrates, e.g., glass, or flexible substrates, e.g., a flexible polymer.

The LCD Keyswitch Division of Rapid Technology Interfaces Ltd. has developed a pushbutton key switch that integrates a liquid crystal display (LCD), which is backlit with four pairs of light emitting diodes (LEDs), and an application specific integrated circuit (ASIC) internal controller chip. The LCD can display text and graphics, as well as animation, and is directed to input systems for telecommunications, CTI, point-of-sale, military and industrial control panels, audio/video production equipment, and radio and TV studio controls. The display can be changed dynamically when a function of the key switch is changed. In general, the key switch implements four connections for supply power, ground, a clock and a data line and two additional connections serve as switch contacts. However, the above-described key switch utilizes a relatively complicated bulky structure that is unwieldy for many applications.

What is needed for automotive and other commercial applications is a retaskable switch-indicator unit that is durable, compact and relatively inexpensive to manufacture. It would also be desirable if the unit minimized electromagnetic interference (EMI), so as to not adversely affect other electronic systems of the motor vehicle.

SUMMARY OF THE INVENTION

The present invention is directed to an integrated switch-indicator unit that includes, for example, a light emitting diode (LED) structure for providing a plurality of indicators and an overlay input device that includes a non-conductive substrate and a plurality of conductive electrode pairs. The plurality of conductive electrode pairs are formed on the substrate and each of the electrode pairs forms a proximity sensitive region. These regions include a first electrode that receives an input signal and a second electrode that provides an output signal. The first and second electrodes are capacitively coupled and the capacitance of the electrode pair changes when a conductive member, e.g., a user's finger, is located near the electrode pair.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT(S)

According to an embodiment of the present invention, a transparent overlay input device implements a capacitive sensor, which can sense both the proximity of a user's finger and the actual physical contact of the user's finger. This allows for accurate sensing of the user's intention under a wide variety of conditions, including operation of the input device while the user is wearing gloves. According to the present invention, electronic circuitry is implemented which is capable of detecting very small changes in the capacitance of electrode pairs of the sensor due to the presence of a conductive member, e.g., a user's finger, near a first and second electrode of the electrode pair.

According to alternative embodiments of the present invention, the cost of the transparent overlay input device is minimized by multiplexing or distributing the input signal provided by a signal source. Thus, according to the present invention, a transparent overlay input device can be fabricated that is sensitive to human interaction and includes a multitude of sensing points, which are defined by electrode pairs. These electrode pairs are formed with a transparent conductive material that is deposited and patterned upon a transparent non-conductive substrate, e.g., a flexible dielectric material.

Figure 1:
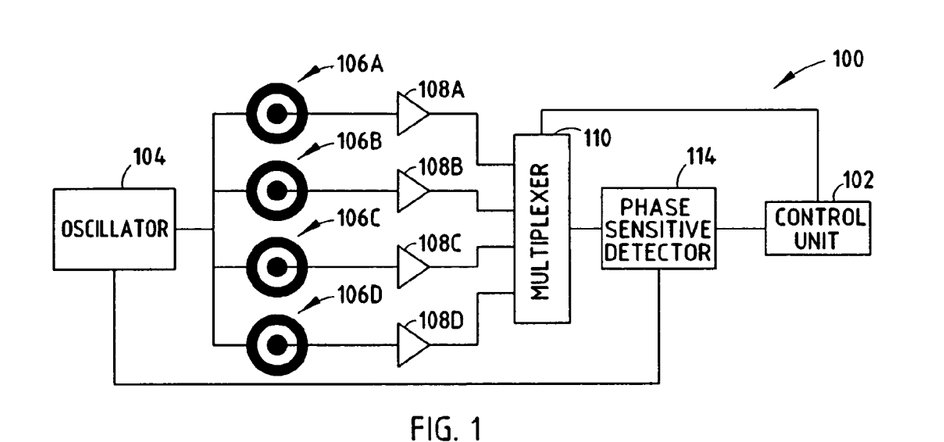
FIG. 1 is an electrical block diagram of an automotive display proximity sensitive input system, according to one embodiment of the present invention.

As is shown in FIG. 1, a proximity sensitive input system 100 includes a control unit 102 that is coupled to an output of a phase sensitive detector 114 and to one or more select lines of a multiplexer 110. As used herein, the term "control unit" may include, for example, a microcontroller, a microprocessor with an application appropriate amount of volatile and non-volatile memory, a field programmable gate array (FPGA), an application specific integrated circuit (ASIC) and a programmable logic device (PLD). The oscillator (i.e., signal source) 104 provides an input signal (e.g., an AC signal having a frequency less than 1 MHz) to a first electrode of each of a plurality of electrode pairs 106A, 106B, 106C and 106D.

A second electrode of the electrode pair 106A is coupled to an input of an amplifier 108A, whose output is coupled to a first input of the multiplexer 110, and a second electrode of the electrode pair 106B is coupled to an input of an amplifier 108B, whose output is coupled to a second input of the multiplexer 110. A second electrode of the electrode pair 106C is coupled to an input of an amplifier 108C, whose output is coupled to a third input of the multiplexer 110, and a second electrode of the electrode pair 106D is coupled to an input of an amplifier 108D, whose output is coupled to a fourth input of the multiplexer 110.

An output of the oscillator 104 is also provided to an input of the detector 114 and is used as a reference signal such that the detector 114 can detect a signal at the same frequency as the oscillator, but at a 90 degree phase shift. Thus, the detector output is proportional to the inter-electrode capacitance at each electrode pair 106A–106D, when a conductive member is placed in the vicinity of one of the electrode pairs 106A–106D. The amplifiers 108A–108D may be, for example, transconductance amplifiers, which amplify the currents that are capacitively coupled between the electrodes of the electrode pairs 106A–106D.

The control unit 102 controls the multiplexer 110 by providing an appropriate signal on the select line(s) of the multiplexer 110 such that the detector 114 periodically receives a signal routed through each of the electrode pairs 106A–106D. Thus, the control unit 102 can determine when a conductive member is located near a given one of the electrode pairs 106A–106D. While only four electrode pairs are shown in FIG. 1, it should be appreciated that fewer or greater number of electrode pairs can be implemented depending upon the application. Further, while the first electrode of each of the electrode pairs 106A–106D is shown encircling the second electrode of each of the electrode pairs 106A–106D, it should be appreciated, as is discussed below, that a number of different types of electrode pair structures can be implemented. As will be discussed in detail below, the first and second electrodes of the electrode pairs 106A–106D are formed of a transparent conductive material (e.g., indium-tin-oxide (ITO)), which is formed on a transparent non-conductive substrate (e.g., glass or polymer based substrate).

While it is preferential to operate at frequencies of less than 1 MHz due to system cost considerations, it is of course possible to implement the same functionality at frequencies of 1 MHz and higher.

Figure 2:
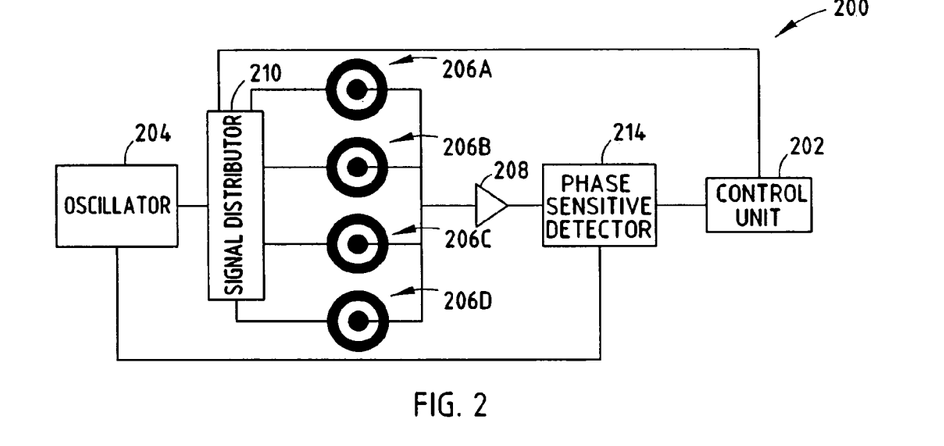
FIG. 2 is an electrical block diagram of an automotive display proximity sensitive input system, according to another embodiment of the present invention.

FIG. 2 depicts an alternative automotive proximity sensitive input system 200, which distributes a signal received from an oscillator (i.e., a signal source) 204 and provides the distributed signal to one of a first electrode of a plurality of electrode pairs 206A–206D. As is shown in FIG. 2, one or more outputs of a control unit 202 are coupled to one or more select lines of a signal distributor 210 and an input of the control unit 202 is coupled to an output of a phase sensitive detector 214. A first input of the detector 214 is coupled to an output of an amplifier 208, whose input is coupled to a second electrode of each of the electrode pairs 206A, 206B, 206C and 206D. A second input of the detector 214 receives a reference signal from the signal source 204.

During operation of the system 200, the control unit 202 is programmed to periodically control the select line(s) of the distributor 210 such that an input signal provided by the oscillator 204 to an input of the distributor 210 is sequentially provided to a plurality of outputs of the distributor 210. As shown in FIG. 2, the outputs of the distributor 210 are coupled to a first electrode of the electrode pairs 206A–206D. It should be appreciated that the system 200 only requires one amplifier, while the system 100 of FIG. 1 requires four amplifiers. Based upon the output of the detector 214, the control unit 202 can determine if a user has located a conductive member, e.g., a user's finger, near one or more of the electrode pairs 206A–206B and, if so, implement an appropriate function based upon the function assigned to a given electrode pair.

It may be desirable to further increase the ability to discriminate which electrode is being activated (especially when many electrode pairs are being used or when the multiple electrode pairs are relatively closely spaced) by simultaneously multiplexing the drive signal to the array of electrode pairs, as shown in FIG. 2, and multiplexing the sensing elements of the electrode pairs as shown in FIG. 1. In this manner, only a single electrode pair will be sensed at a given time, reducing the potential for crosstalk with adjacent electrode pairs.

Figure 3:
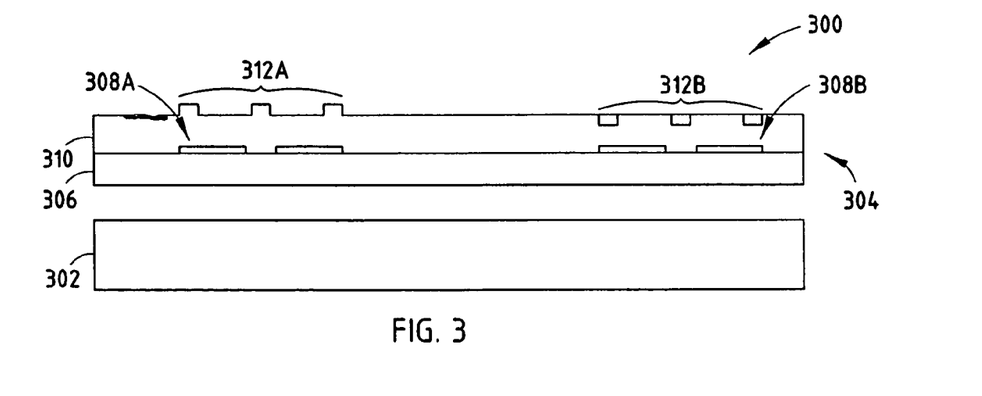
FIG. 3 is a cross-sectional view of an automotive display panel and a transparent overlay input device, according to one embodiment of the present invention.

FIG. 3 depicts a portion of an automotive proximity sensitive input system 300, which includes an automotive display panel (e.g., a liquid crystal diode (LCD) display) 302, which provides desired graphics to a vehicle occupant through a transparent overlay input device 304. The input device 304 includes a transparent non-conductive substrate 306, which has formed thereon a plurality of transparent conductive electrode pairs 308A and 308B. A transparent non-conductive cover 310 is formed over the transparent conductive electrode pairs 308A and 308B. The transparent non-conductive cover 310 may include touch sensitive areas 312A and 312B (to provide tactile feedback to a user) formed in the vicinity of the electrode pairs 308A and 308B, respectively, which may be raised or indentations formed in the transparent non-conductive cover 310.

Figure 5:
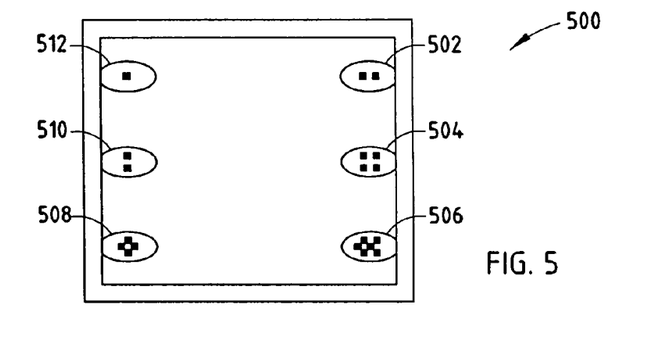
FIG. 5 is a front view of a transparent overlay input device including a plurality of touch sensitive areas, according to another embodiment of the present invention.

With reference to FIG. 5, the touch sensitive areas 312A and 312B may take on various shapes 502–512. Utilizing textured touch sensitive areas can advantageously allow a vehicle operator to provide an input to the transparent overlay input device while maintaining their eyes on the road for increased safety. It should be appreciated that other patterns may be utilized for the texturing of touch sensitive areas to provide various degrees of tactile feedback to a vehicle operator. Referring back to FIG. 3, it should be appreciated that the layers of the input device 304 may be flexible such that the input device 304 can conform to the surface of various types of display panels.

Figure 4:
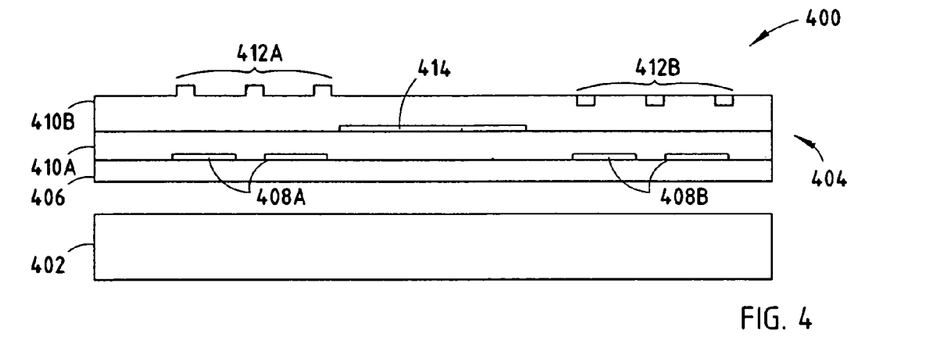
FIG. 4 is a cross-sectional view of an automotive display panel and a transparent overlay input device, according to another embodiment of the present invention.

FIG. 4 depicts an automotive proximity sensitive input system 400, according to another embodiment of the present invention. The input device 404 includes a transparent non-conductive substrate 406, which has formed thereon, a plurality of transparent electrode pairs 408A and 408B. A first transparent non-conductive cover 410A is formed on the substrate 406 over the transparent electrode pairs 406A and 406B. A second transparent conductive layer 414 is formed on the first transparent non-conductive cover 410A in areas away from the electrode pairs 408A and 408B. A second transparent non-conductive cover 410B is formed over the second transparent conductive layer and may include textured areas 412A and 412B above the electrode pairs 408A and 408B to provide tactile feedback to a user. As is shown in FIG. 4, the textured area 412A includes a series of bumps and the textured area 412B includes a series of indentations.

The primary difference between the system 400 of FIG. 4 and the system 300 of FIG. 3 is that the second transparent conductive layer 414 has been formed on the first transparent non-conductive cover 410A in areas away from electrode pairs 408A and 408B. The second transparent conductive layer 414, in general, results in improved operation of the input device 404 by defining sensitive and non-sensitive regions for the input device 404. That is, by shielding the first and second electrode leads of the electrode pairs 408A and 408B, formed on transparent substrate 406, erroneous signals are not generated as a vehicle occupant moves their hand across the face of the input device 404.

Figure 6:
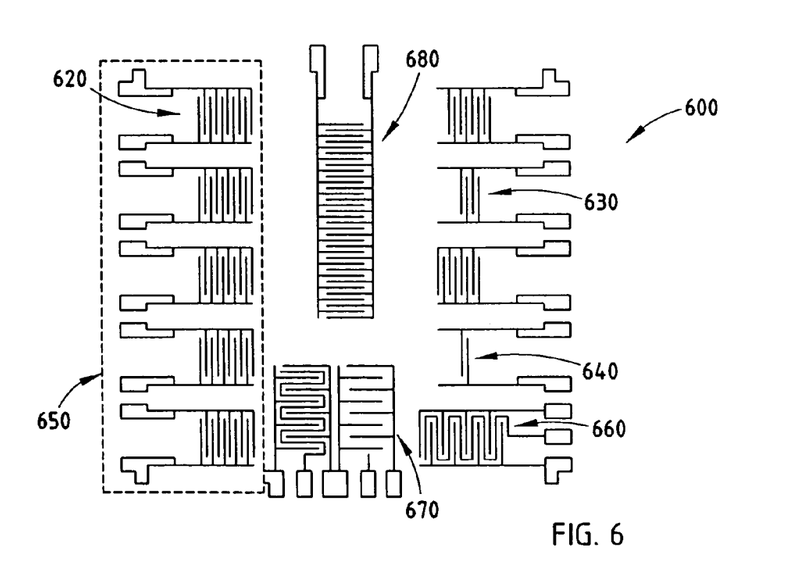
FIG. 6 is a schematic view of a number of transparent conductive electrode pairs whose first and second electrodes each include interdigitated fingers.

Turning to FIG. 6, a test pattern 600 is illustrated which shows a number of electrode pairs with different exemplary structures. It should be appreciated that the details of the electrode pair (i.e., the switch pad geometry) determine the range of the switching effect, the overlap between adjacent switch pad locations and the ability to implement more complicated switching functions, e.g., multi-step switching or potentiometric switching (by variations in the pattern of the electrode pairs or by temporal modulation of the driving signals) to, for example, change radio volume and/or channel. An electrode pair 620 is formed with contacting leads that connect external circuitry to an interdigitated series of fingers whose number may be adjusted as is shown by electrode pairs 630 and 640 to achieve a desired sensitivity.

As is shown in FIG. 6, the spacing between the fingers and the relative width of the fingers with respect to the spacing may also be adjusted and may include several adjacent electrode pairs 650. The nodes may be identical or they may comprise different variations of the illustrated embodiments. A typical electrode pair may approximate the size of a fingertip, e.g., on the order of 1.3 $cm^2$, although other variations are envisioned. Electrode pair 660 depicts the use of a ground plane (or a differently biased conductive element) implemented between interdigitated first and second electrodes. Electrode pair 670 shows the electrode pair 660 minus the ground between the first and second electrodes. As was previously mentioned, a control unit of an automotive display proximity sensitive input system sequentially interrogates or drives each electrode pair to evaluate the capacitance change from nominal and applies a decision threshold to evaluate the intentions of a vehicle occupant. Alternatively, different sensor structures can be utilized to vary sensitivity and/or provide potentiometer like inputs. Such structures can make use of variations in the pitch of the interdigitated structures or in the separation between a pair of fingers.

Figure 7A:
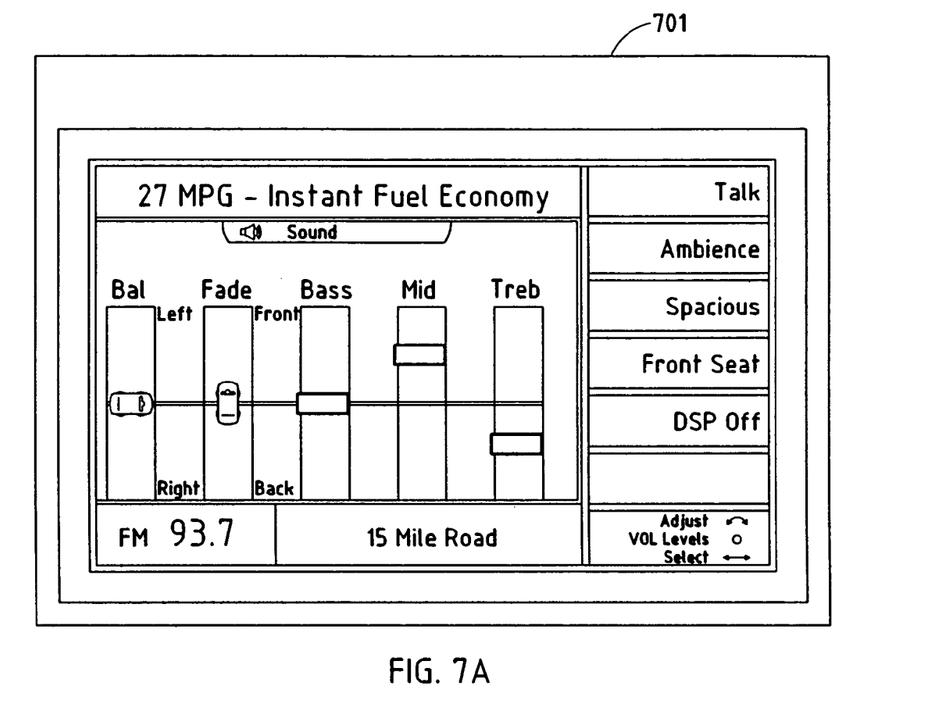
FIGS. 7A and 7B are front views of an exemplary automotive display panel as seen through a transparent overlay input device and a view of a plurality of electrode pairs of the input device, respectively, according to an embodiment of the present invention.
Figure 7B:
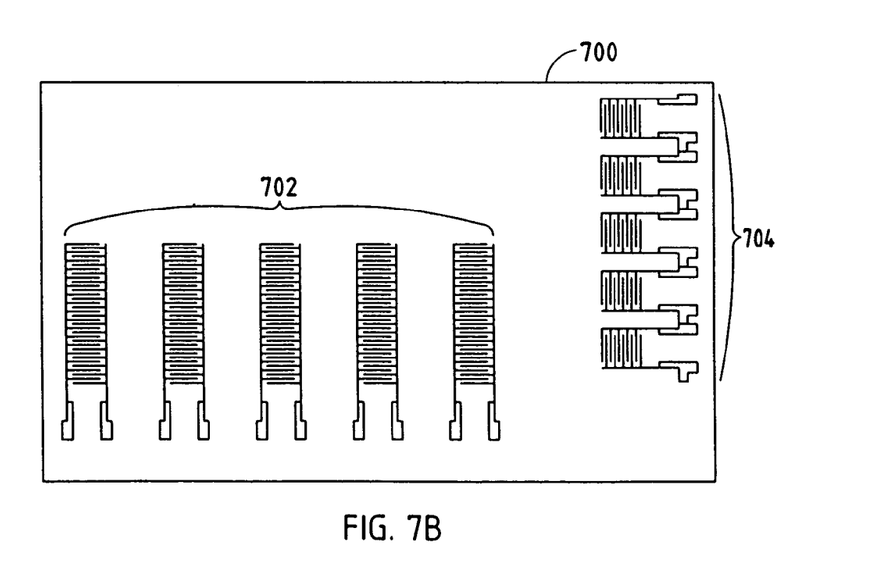

FIGS. 7A and 7B illustrate exemplary graphics 701 provided by an automotive display and associated transparent conductive electrode pairs 702 and 704, which are formed in a transparent overlay input device 700, respectively. Variations in electrode pair geometries can be used to achieve variation in sensing sensitivity. For example, the electrode pairs 702 have increased sensitivity, with respect to the electrode pairs 704.

Accordingly, a transparent overlay input device has been described herein, which allows for easy operation and can be utilized by a user wearing gloves and, as such, is particularly advantageous when implemented within an automotive environment. According to the present invention, a transparent overlay input device can be implemented within an automotive environment for a relatively low cost. This device can resolve a few femtofarads of capacitance change out of picofarads of differential capacitance and nanofarads of shunt capacitance. Such a system is relatively immune to environmental effects, such as water, dirt and temperature and tends to minimize electromagnetic interference (EMI) with other vehicle systems due to its operation at relatively low frequencies. Additionally, the method for detecting capacitance can make use of an oscillator that produces a fundamental frequency and harmonics (e.g., a triangle wave) or a fundamental frequency alone (e.g., a sine wave) for further suppression of potential EMI issues. In automotive display applications, such as reconfigurable message centers, map displays and/or high content entertainment systems, implementing an automotive display system, according to the present invention, is particularly advantageous. If the transparent overlay input device is implemented as a flexible device, it can be implemented on displays and/or display elements with non-planar geometry.

Figure 8:
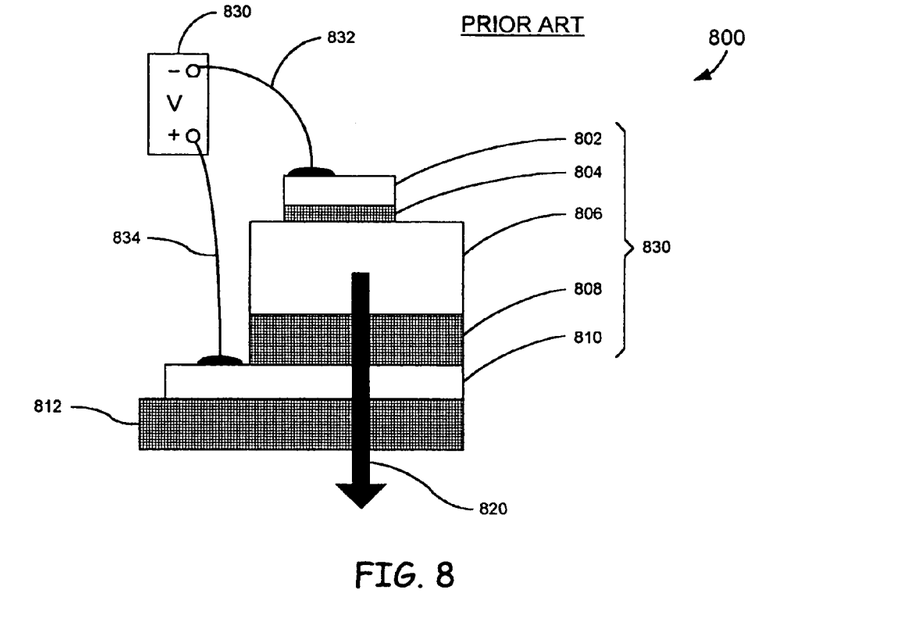
FIG. 8 is a cross-sectional view of an exemplary OLED/PLED structure fabricated on a glass substrate.

According to another embodiment of the present invention, a light emitting diode structure, such as an organic light emitting diode (OLED) or a polymer light emitting diode (PLED), is combined with an overlay input device to provide a switch-indicator unit. Such light emitting diode structures can be built on a variety of substrates, both opaque and transparent, and can be designed to emit a variety of colors. With reference to FIG. 8, a diagram of an exemplary OLED device 800, which includes a glass substrate 812 on which is formed an OLED structure 830, is depicted. Alternatively, the more established technology of conventional, inorganic light emitting diodes could be employed to provide the indicator functions of such a switch-indicator unit. Other indicator structures that can be reconfigured by electrical input commands, such as field emission display arrays and liquid crystal displays, may be incorporated as well. Independent of the indicator technology used, it is desirable to provide for the capability to reconfigure, or change the displayed images in order to allow full versatility of the switch-indicator units.

The OLED structure 830 includes: an indium tin oxide (ITO) layer 810 formed on the glass substrate 812; a hole transparent layer 808 formed on the ITO layer 810; an electron transport and luminescent (ETL) layer 806 formed on the hole transport layer 808; a magnesium silver alloy layer 804 formed on the ETL layer 806; and a silver layer formed on the magnesium silver alloy layer 804. The OLED structure 830 is powered by a power source 830 that is electrically coupled, by leads 834 and 832, to the layers 802 and 810, respectively.

Figure 9A:
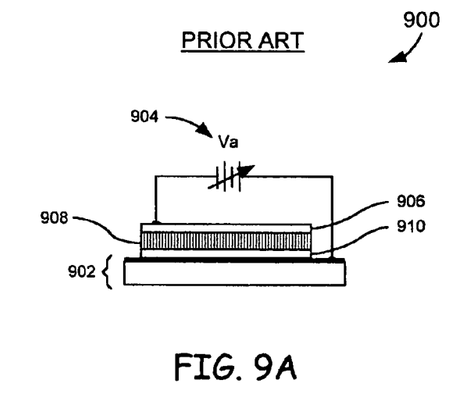
FIGS. 9A–9B are cross-sectional views of an exemplary OLED/PLED structure fabricated on a flexible plastic substrate.
Figure 9B:
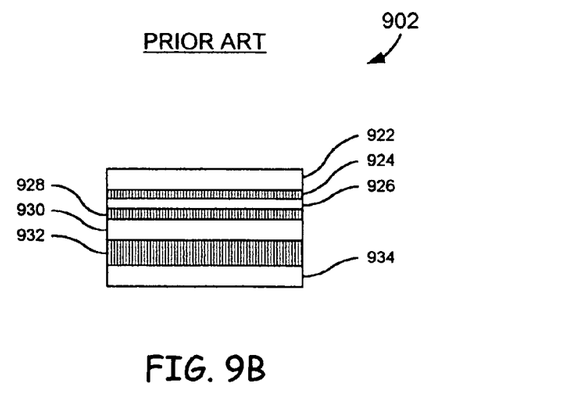

FIGS. 9A and 9B depict diagrams of another exemplary OLED device 900 that includes a flexible plastic substrate 902 on which is formed a portion of an OLED structure, i.e., a hole transport layer 910, an electroluminescent layer 908 and an aluminum electrode layer 906. The OLED structure receives power from a power supply 904, which is coupled between the aluminum electrode 906 and a conductive layer 922 formed on the substrate 902. As is better shown in FIG. 9B, the substrate 902 includes a hard coat 934 formed on one side of a low birefringence plastic base 932 and another hard coat layer 930 formed on a second surface of the plastic base 932. An oxygen/moisture barrier layer 928 is formed on the hard coat layer 930 and a metal oxide layer 926 is formed on the layer 928. A metallic layer 924 is formed on the layer 926 and a metal oxide layer 922, such as an indium tin oxide (ITO), is formed on the layer 924.

Figure 10:
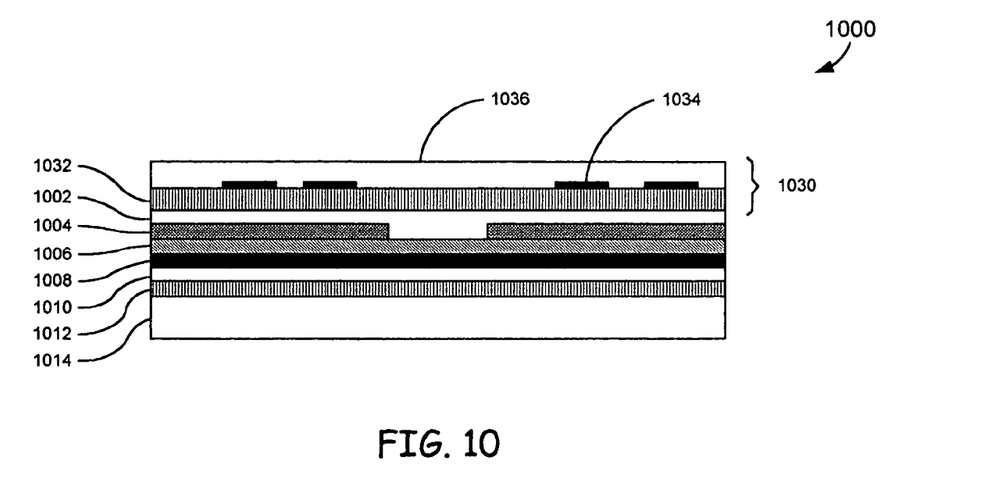
FIG. 10 is a cross-sectional view of an exemplary reconfigurable switch-indicator unit, according to one embodiment of the present invention.

FIG. 10 depicts a cross-sectional diagram of a switch-indicator unit 1000 formed according to one embodiment of the present invention. As is shown in FIG. 10, a moisture barrier stack 1012 is formed on a substrate 1014. A lower electrode 1010 is formed on the moisture barrier stack 1012 and an electron transport layer 1008 is formed on the lower electrode 1010. A hole transport layer 1006 is formed on the electron transport layer 1008 and an upper electrode layer 1004 is formed on the hole transport layer 1006. A planarizing dielectric layer 1002 is formed on the upper electrode layer 1004 and a transparent substrate 1032 is formed or joined to the layer 1002. A transparent conductive electrode layer 1034 is formed on the substrate 1032 and a transparent cover layer 1036 is formed over the layer 1034, which includes a plurality of conductive electrode pairs. As shown, the layers 1002–1014 form the indicator unit on top of which is formed a switch 1030, which includes the transparent substrate 1032, the transparent conductive electrode layer 1034 and the transparent cover layer 1036. Additionally, it is possible to incorporate additional non-conductive layers and additional conductive layers (as for example a layer or layers to further shape or configure the extent of the electric fields generated and detected by the layers shown in FIG. 10.

Thus, the present invention is generally directed to the integration of a light emitting diode structure, e.g., an OLED or a PLED, with capacitive touch screen technology to form a small footprint switch-indicator unit that can be incorporated on flexible substrates, if desired. In the embodiment shown in FIG. 10, the switching structure is fabricated on top of a display or indicator structure. Alternatively, the display or indicator structure may be fabricated on top of the switch structure.

According to another embodiment of the present invention, display control electronics and switch control electronics are incorporated in a single integrated circuited (IC) (that controls access to a vehicle communications bus, for example, a local interconnect network (LIN) bus, which is also integrated within the switch-indicator unit. In this manner, a single switch or group of switches that includes such an IC can be implemented as an assembly in various vehicle locations and be utilized to control various vehicle accessories. For example, the assembly may be implemented in a steering wheel and provide for operation of radio and entertainment functions, heating ventilation and air conditioning (HVAC) functions and interior light functions.

Figure 11:
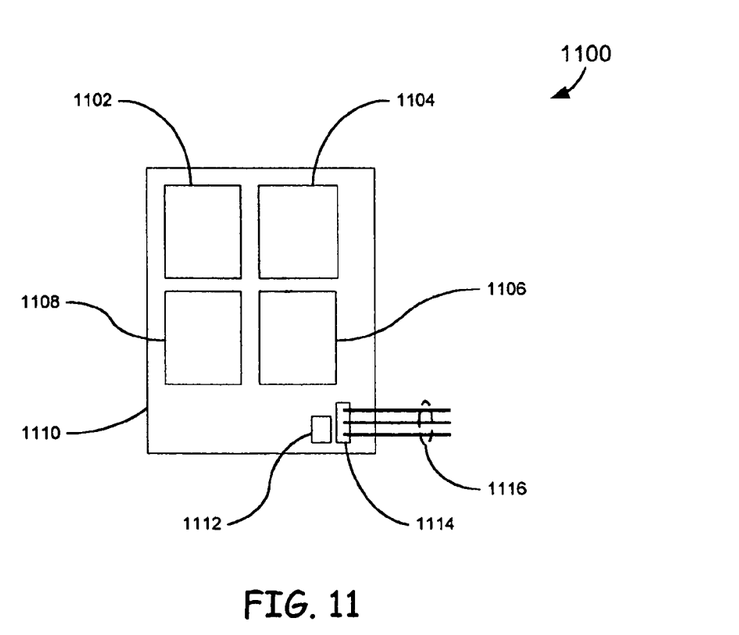
FIG. 11 is a diagram of an exemplary reconfigurable switch-indicator grouping including four reconfigurable switch-indicator units that interface to an automotive bus.
Figure 13:
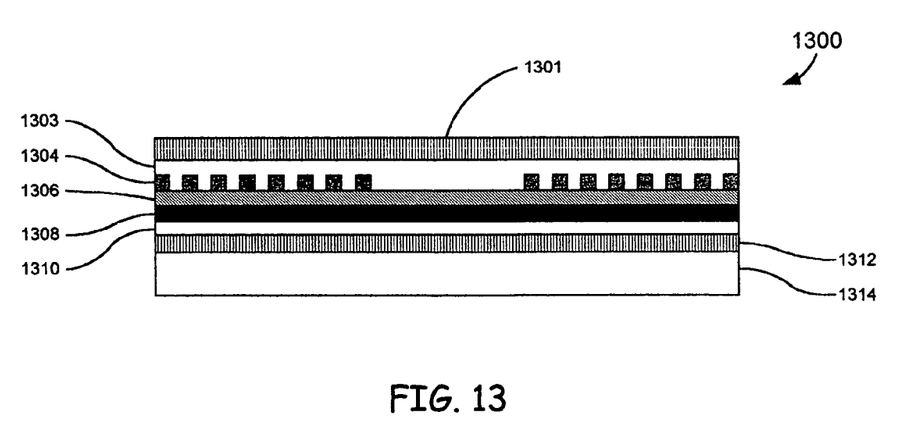
FIG. 13 is a cross-sectional view of an exemplary reconfigurable switch-indicator unit, according to another embodiment of the present invention.

As is shown in FIG. 11, a pod 1100 includes four switch-indicator units 1102, 1104, 1106 and 1108 fabricated according to an embodiment of the present invention, e.g., that shown in FIGS. 10 and 13. The switch-indicator units 1102–1108 are formed on a substrate 1110, which includes an integrated controller/bus access IC 1112 that is coupled to the units 1102–1108 and to an automotive bus 1116, through a connector 1114. The automotive bus 1116 may provide power, ground, clock and data lines for communication between the IC 1112 and a processor coupled to the bus 1116. It should be appreciated that when the display control electronics and switch control electronics are integrated within a single CMOS IC, system costs can be further reduced.

According to another embodiment of the present invention, the switch-indicator units 1102–1108 are intelligent units that provide information concerning the function of the switches as they change, for instance, from a radio on/off function to a volume increase/decrease function to an equalizer function, etc. The pod 1100, when provided in a flexible package, can readily be provided as a tear-away structure, such as a steering wheel cover. As previously discussed, OLED and PLED diode arrays may be formed on a flexible or non-flexible substrate to provide retaskable indicators. In this configuration, the indicators may include a cluster of light emitting diode structures forming individually addressable icons or words illuminated, as appropriate, to convey the present function of a switch or can include a multiplex two-dimensional array of individually addressable diodes or pixels that can be used to form the pattern of any icon or word, depending upon the current function of the switch.

Figure 12A:
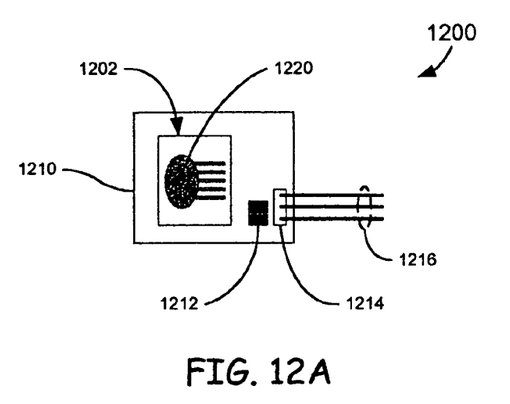
FIGS. 12A–12E are diagrams of an exemplary reconfigurable switch-indicator unit that interfaces to an electronic data communication bus.
Figure 12B:
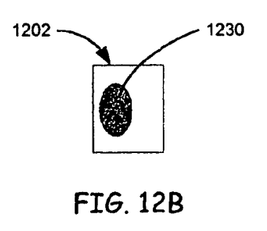
Figure 12C:
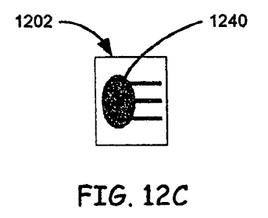
Figure 12D:
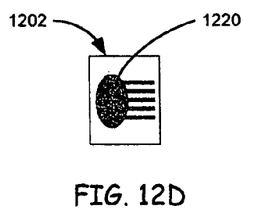
Figure 12E:
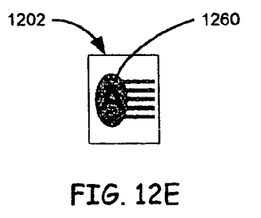

With reference to FIG. 12A, a pod 1200 is shown that includes a single switch-indicator unit 1202, e.g., taking the form shown in FIG. 10 or FIG. 13, formed on a substrate 1210 and controlled by an integrated controller/bus access IC 1212 that connects to a bus 1216, via a connector 1214. As is shown, when the switch-indicator unit 1202 is used to control headlamps of a motor vehicle during vehicle operation, some portion of the indicator structure may be turned on at all times in order to identify the location and function of the switch, i.e., as provided by image 1220. With reference to FIG. 12B, the unit 1202 may supply image 1230 when the vehicle headlamps are off. With reference to FIG. 12C, the unit 1202 may supply image 1240 when the headlamps are on low. FIG. 12D shows the unit 1202 supplying image 1220 when the vehicle headlamps are on high. When the headlamps are in automatic dimming mode, the unit 1202 may provide image 1260, as is shown in FIG. 12E. Thus, during vehicle operation, some portion of the indicator structure may be turned on at all times in order to identify the location and function of the switch. Following activation of the switch, the displayed image/icon may change.

For example, when the headlamps are off and the switch is activated to switch the headlamps to low beam, the icon change is effected by illumination of additional indicators to indicate that lamps have been switched to low beam. The low beam indication of the switch-indicator unit 1202 may be in direct response to operator input commanding the lights to low beam or may be used to feedback across the vehicle bus to indicate the lamps are indeed at the low brightness level. That is, the indicator function may confirm operational status of the switch system, which indicates the lamps are functioning, not burned out, etc. Further actuation of the switch may command the lamps to full brightness operation, as indicated by the illumination of additional segments in the indicator structure. A third switch actuation may command the headlamps into an automatic brightness control mode of operation in response to oncoming traffic, as indicated by the appearance or turning off of segments corresponding to the letter 'A' (see FIG. 12E). A fourth actuation of the switch may turn the headlamps off and return the indicator appearance to that shown in the FIG. 12B. It should be appreciated that this represents just one example of the use of an intelligent or retaskable switch-indicator unit. Thus, the present invention is broadly directed to merging of input sensing and indicator display functions.

It is also contemplated that both switch and indicator functions may be operated from a common electrode structure. FIG. 13 illustrates a common electrode structure for the switch and indicator functions. More specifically, as is shown in FIG. 13, the switch-indicator unit 1300 includes a substrate 1314, upon which is formed a moisture barrier stack 1312, a reflective lower electrode 1310, an electron transport layer 1308, a hole transparent layer 1306 and a plurality of upper electrodes 1304, which are formed as an interdigitated electrode structure for providing DC bias for PLED/OLED and RF for proximity sensing. In this manner, it is possible to use relatively conventional conductive materials (i.e. non-transparent conductive materials) to form the electrode structure without impeding the viewability of the underlying display elements. This benefit of using lower cost conventional materials is accrued in addition to the simplification of the fabrication of the switch indicator unit that results from the use of a single conductive layer to provide electrode contact for both the sensing function and the indicator function of the switch-indicator unit.

Formed on top of the electrode structure 1304 is a planarizing dielectric 1303, upon which is formed an upper protective dielectric moisture barrier 1301. By implementing a comb-type electrode structure, it is possible to use a non-transparent conductive film as the electrode element relying on the spaces between the comb elements to allow light to be emitted to the operator. Such integrations can be utilized to reduce costs and improve system performance of a switch-indicator unit.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An integrated automotive switch-indicator unit, comprising:
   a light emitting diode structure for providing a plurality of indicators, wherein the light emitting diode structure is one of an organic light emitting diode (OLED) structure and a polymer light emitting diode (PLED) structure;
   an overlay input device integrated with the light emitting diode structure, the overlay input device comprising:
   a non-conductive substrate;
   a plurality of conductive electrode pairs formed on the substrate, wherein each of the electrode pairs forms a proximity sensitive region and includes a first electrode that receives an input signal and a second electrode that provides an output signal, and wherein the first and second electrodes of each of the electrode pairs are capacitively coupled and the capacitance of each of the electrode pairs changes when a conductive member is located near a given one of the electrode pairs; and
   a first non-conductive cover formed on the substrate over the electrode pairs; and
   an integrated controller/bus access integrated circuit (IC) coupling the light emitting diode structure and the overlay input device to an automotive bus, the IC controlling the illumination of the light emitting diode structure to identify a location and function of a switch and sensing when the capacitance of one of the electrode pairs changes to indicate a switch input.

2. The unit of claim 1, wherein the substrate is flexible.

3. The unit of claim 1, wherein the substrate is one of a glass substrate and a plastic substrate.

4. The unit of claim 1, wherein the non-conductive substrate is transparent, the plurality of conductive electrode pairs are transparent and the first non-conductive cover is transparent.

5. The unit of claim 1, wherein the light emitting diode structure and the overlay input device share a common electrode structure.

6. An integrated switch-indicator unit, comprising:
   a light emitting diode structure for providing a plurality of indicators; and
   an overlay input device integrated with the light emitting diode structure, the overlay input device comprising:
   a non-conductive substrate; and
   a plurality of conductive electrode pairs formed on the substrate, wherein each of the electrode pairs forms a proximity sensitive region and includes a first electrode that receives an input signal and a second electrode that provides an output signal, and wherein the first and second electrodes of each of the electrode pairs are capacitively coupled and the capacitance of each of the electrode pairs changes when a conductive member is located near a given one of the electrode pairs.

7. The unit of claim 6, wherein the substrate is flexible.

8. The unit of claim 6, wherein the substrate is one of a glass substrate and a plastic substrate.

9. The unit of claim 6, wherein the non-conductive substrate is transparent and the plurality of conductive electrode pairs are transparent.

10. The unit of claim 6, wherein the light emitting diode structure and the overlay input device share a common electrode structure.

11. The unit of claim 6, wherein the light emitting diode structure is one of an organic light emitting diode (OLED) structure and a polymer light emitting diode (PLED) structure.

12. The unit of claim 6, further including:
    an integrated controller/bus access integrated circuit (IC) coupling the light emitting diode structure and the overlay input device to an automotive bus, the IC controlling the illumination of the light emitting diode structure to identify a location and function of a switch and sensing when the capacitance of one of the electrode pairs changes to indicate a switch input.

13. The unit of claim 6, further including:
    a first transparent non-conductive cover formed on the substrate over the electrode pairs.

14. An integrated switch-indicator unit, comprising:
    a light emitting diode structure for providing a plurality of indicators; and
    an overlay input device integrated with the light emitting diode structure, the overlay input device comprising:
    a non-conductive substrate;
    a plurality of conductive electrode pairs formed on the substrate, wherein each of the electrode pairs forms a proximity sensitive region and includes a first electrode that receives an input signal and a second electrode that provides an output signal, and wherein the first and second electrodes of each of the electrode pairs are capacitively coupled and the capacitance of each of the electrode pairs changes when a conductive member is located near a given one of the electrode pairs; and
    a first non-conductive cover formed on the substrate over the electrode pairs.

15. The unit of claim 14, wherein the substrate is flexible.

16. The unit of claim 14, wherein the substrate is one of a glass substrate and a plastic substrate.

17. The unit of claim 14, wherein the non-conductive substrate is transparent, the plurality of conductive electrode pairs are transparent and the first non-conductive cover is transparent.

18. The unit of claim 14, wherein the light emitting diode structure and the overlay input device share a common electrode structure.

19. The unit of claim 14, wherein the light emitting diode structure is one of an organic light emitting diode (OLED) structure and a polymer light emitting diode (PLED) structure.

20. The unit of claim 14, further including:
an integrated controller/bus access integrated circuit (IC) coupling the light emitting diode structure and the overlay input device to an automotive bus, the IC controlling the illumination of the light emitting diode structure to identify a location and function of a switch and sensing when the capacitance of one of the electrode pairs changes to indicate a switch input.

* * * * *